United States Patent

Kantor

[15] 3,654,469
[45] Apr. 4, 1972

[54] MATRIX-FORM PROPORTIONAL-MODE RADIATION DETECTOR

[72] Inventor: Frederick W. Kantor, 523 West 112th St. Apt. 32, New York, N.Y. 10025

[22] Filed: May 16, 1969

[21] Appl. No.: 825,337

[52] U.S. Cl. ..................................250/83.6 R, 313/93
[51] Int. Cl. ..................................................G01t 1/18
[58] Field of Search..........................250/83.6; 313/93

[56] References Cited

UNITED STATES PATENTS

| | | | |
|---|---|---|---|
| 3,033,984 | 5/1962 | Fisher et al. | 250/83.6 X |
| 3,050,626 | 8/1962 | Dukes et al. | 250/83.6 X |
| 3,234,386 | 2/1966 | Leventhal et al. | 250/83.6 X |
| 3,372,295 | 3/1968 | Sparks | 250/83.6 X |
| 3,418,474 | 12/1968 | Spergel et al. | 250/83.6 |

*Primary Examiner*—James W. Lawrence
*Assistant Examiner*—Davis L. Willis
*Attorney*—Curtis, Morris & Safford

[57] ABSTRACT

A matrix-form radiation detector, operating in the proportional gas mode, is provided for indicating the $x$ and $y$ coordinates of each ionizing event caused by the radiation. This information is utilized to form an image of the radiation pattern being detected. The detector has a plurality of cathodes arranged in columns and rows. The cathodes in each column are connected to one another, and those in each row are electrically isolated from one another. A plurality of anode wires is provided. Each cathode substantially encircles one of the anode wires, and each wire passes through all of the cathodes in a given row. Encoding circuitry and other means are provided for encoding the address of each ionizing event, and for storing and/or displaying the encoded information.

22 Claims, 8 Drawing Figures

INVENTOR
FREDERICK W. KANTOR
BY
Curtis, Morris & Safford
ATTORNEYS

INVENTOR
FREDERICK W. KANTOR
BY
Curtis, Morris & Safford
ATTORNEYS

MATRIX-FORM PROPORTIONAL-MODE RADIATION DETECTOR

This invention relates to radiation detectors; more particularly, this invention relates to image-sensing detectors for ionizing radiation.

Prior image-forming radiation detectors have a number of disadvantages. For example, in the medical examination of patients by means of X-rays, the use of X-ray photographic film and fluoroscopic screens to form images usually suffers both from low efficiency and relatively poor image resolution. Other types of detectors, such as that shown in German Auslegeschrift No. 1,179,307, are believed to suffer also from poor energy resolution; that is, from inability to distinguish certain radiation from other radiation on the basis of differences in the energy of the radiation.

One result of the low efficiency of such prior devices is that relatively large dosages of X-rays must be used in the medical examinations in order to obtain a reasonably clear picture of the body area being examined. As a result, the patient is subjected to potentially dangerous levels of radiation. Perhaps even more seriously, the doctor or technician using the X-ray equipment repeatedly receives doses of stray radiation in an amount which may seriously injure him. As a result of the foregoing difficulties, the beneficial use of X-ray examination has been seriously limited by the overdosages which necessarily result from present image formation techniques. In fact, although it would be highly desirable to use X-rays in examining unborn fetuses, the presently-required high level of X-radiation practically prohibits such use.

Similar problems of inefficiency and relatively poor resolution also prevail in the detection of radiation from other sources, such as astronomical bodies.

In accordance with the foregoing, one object of the present invention is to provide a radiation detecting device which is capable of providing images of radiation from relatively low-flux sources with relatively high efficiency and resolution. It is a further object of the present invention to provide such a device which has relatively high energy resolution, and which is compact and reliable in operation.

In accordance with the present invention, a matrix-form detector, operating in the proportional gas mode, is provided for indicating the $x$ and $y$ coordinates of each ionizing event caused by the radiation. The matrix is composed of a plurality of cells, each having a cathode member substantially encircling a wire anode element. The cathode elements are arranged in columns in which all of the cathode elements are electrically interconnected with one another. The cathode elements also are arranged in rows, with a single anode wire passing through each of the cathodes in a given row. The address of each ionizing incident is determined, and this information is used to produce an image of the radiation pattern being received.

Other objects, aspects and advantages of the present invention will be set forth in or apparent from the following description and drawings:

GENERAL DESCRIPTION

Figure 1:
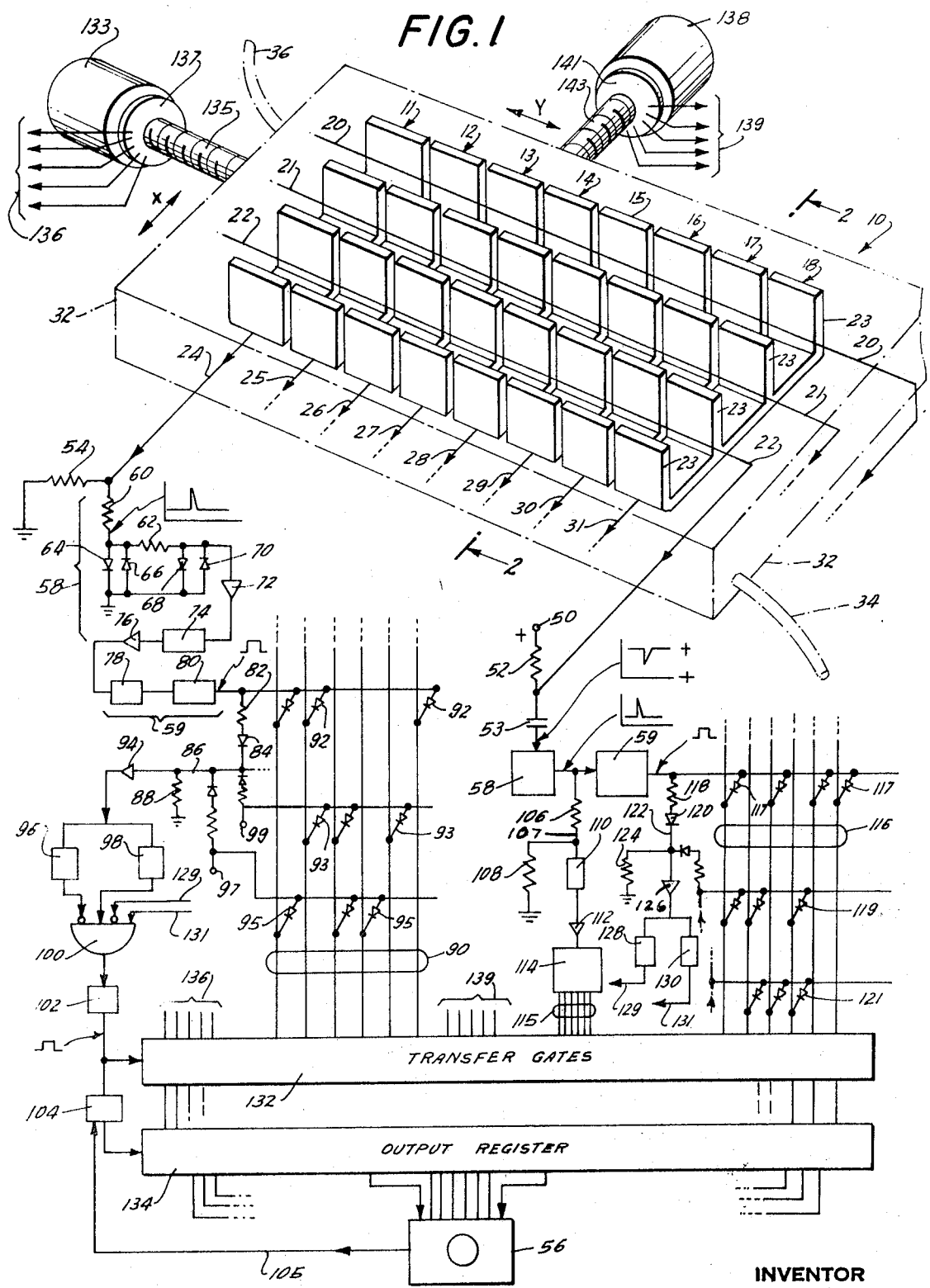
FIG. 1 is a perspective, partially schematic view of an embodiment of the radiation detector device of the present invention.
Figure 2:
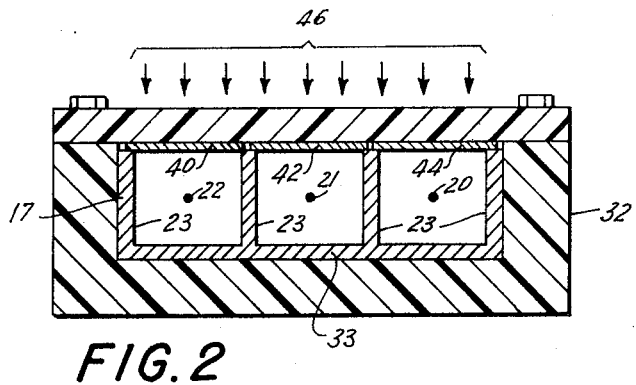
FIG. 2 is a cross-sectional view taken along line 2—2 of FIG. 1.

Referring first to FIG. 1, the radiation detector 10 includes a plurality of cathode elements 11 through 18, and a plurality of anode wires 20, 21 and 22 mounted in a housing 32 which is shown in dashed outline. As is shown in FIG. 2 as well as FIG. 1, each cathode element is made of a conductive material such as metal and includes a base portion 33 with walls 23 extending upwardly from the base portion 33 at evenly spaced intervals. Referring specifically to FIG. 2, the housing 32 has a gas-tight cover 38 secured to it and forming a window for admitting radiation into the detector. The housing 32 and the cover 38 preferably are made of a plastic material such as "Mylar." Secured to the under-surface of the cover 38 is a plurality of thin aluminum strips 40, 42 and 44, each of which is of the same width as the width of the cathode elements 11–18, and has a length just sufficient to enable it to bridge the space between two adjacent walls 23 of the cathode element structure. Thus, the strips 40, 42 and 44, together with walls 23 and 33, form closed cells each of which encloses one of the anode wires. Actually, it is preferred that a single continuous strip replace each set of strips 40, 42 and 44, because, when the cover 38 bows outwardly under super-ambient internal gas pressure, the ends of such a continuous strip make contact with the end walls 23 despite the bowing.

Referring again to FIG. 1, each of the cathode elements 11–18 is separated from the next cathode element by a gap, or, if desired, by insulating material. Thus, the cells are aligned in rows in which the cells are electrically isolated from one another, with an anode wire 20, 21 or 22 passing through each of the cells in one of the rows, at the approximate center of the cells. The cells also are arranged in columns in which the cells are electrically interconnected to one another.

The anode wire 22 is connected to a high-voltage (e.g., 1,500 volts) positive direct-current electrical source 50 through a relatively large (e.g., 5 megohms) resistor 52. Each of the other anode wires 20 and 21 is connected to the high voltage source in the same manner, although the connections are not shown in FIG. 1 for the sake of simplicity in the drawings. Each of the cathode elements is connected to ground through a relatively large resistor 54, as also is shown in FIG. 1. Only one such connection is shown for the sake of simplicity in the drawings.

The housing 32 is filled with any of a number of well-known gases for use in proportional counters. For example, mixtures of 90 percent argon and 10 percent methane can be used, as can a mixture of 98.4 percent argon and 1.6 percent isobutane. These gases are available commercially. The gas preferably is made to flow through the housing 32 by means of entry and exit tubes 34 and 26 (FIG. 1), as is well known in the art.

With the cover 38 in place, as is shown in FIG. 2, the detector 10 is placed so that the radiation enters the detector in the direction indicated by the arrows 46 in FIG. 2. When radiation such as X-rays is being detected, the photons pass through the window formed by the plastic cover 38 and the thin metallic coatings 40, 42 or 44 and into one of the cells of the detector.

Each cell operates in the manner of a proportional counter tube. That is, when an X-ray photon enters one of the cells and collides with a gas atom, it gives up its energy to the atom and creates a small cloud of electrons and ions. The negative electrons move towards the positively charged anode wire, and the ions move towards the walls of the cathode element. A well-controlled electron avalanche occurs which releases more electrons and ionizes more atoms. The result of this ionizing incident is that a short negative voltage pulse is generated in the anode wire, and a positive pulse is generated in the cathode element in which the cell is located. Since the device is operating in the proportional mode, each ionizing incident does not tend to spread as it might if the device were operating in the Geiger-Mueller mode or in the manner of a spark chamber. Thus, each ionizing event usually takes place only in one cell.

The electrical signal processing circuitry shown in the lower part of FIG. 1 detects the negative pulses from the anode wires and the positive pulses from the cathode elements and produces a unique address for each ionizing incident. This information is processed by the circuitry and stored and displayed, for example, on a cathode ray tube 56 with a bistable storage screen.

ELECTRICAL SIGNAL PROCESSING CIRCUITRY

The signal processing circuitry now will be explained in greater detail. The positive signals on the cathode elements and the negative signals on the anode wires both are processed in a similar manner. The general approach will be explained first with reference to the processing circuitry for the cathode elements.

The pulse from each cathode element is delivered to its own separate amplifying and protective circuit 58, which includes a preamplifier 72, a gain control device 74, and another amplifier 76. The input to the preamplifier 72 is guarded against very large electrical pulses such as those which are created by breakdowns in the gas in the detector, by means of resistors 60 and 62, together with diodes 64, 66, 68 and 70. Ordinary input pulses are of too small an amplitude (e.g., a few millivolts) to drive the diodes into conduction. However, a large pulse of either polarity will force one of the first pair of diodes 64 and 66 to conduct. The voltage presented at the input to resistor 62 is, then, the output of the resistor 60 and the internal resistance of the diodes in their conductive state, acting together as a voltage divider. The maximum amplitude of the input pulses can be several thousand volts. For this reason, the second resistor 62 and a second diode pair 68 and 70 are used, with their input being the output of the circuit comprising diodes 64 and 66, and resistor 60. These two circuits effectively protect the input of the preamplifier from all large input disturbances. In a circuit which was built and successfully tested, resistors 60 and 62 had a resistance of 10,000 ohms each, and the diodes were General Electric Co. No. 1 N4154.

The preamplifier 72 amplifies its input signal enough to establish the signal-to-noise ratio for the signal-processing circuit. The gain control device 74, which is merely a potentiometer, sets the gain of the amplifier 76 so that its output signal is large enough for further analog and/or digital processing (e.g., about ½ to 5 volts each).

The signal from the amplifying and protective circuit 58 is sent to a pulse detecting and shaping circuit 59 which includes a level sensor 78, of conventional construction, which determines whether the signal is sufficiently above the background noise level to be reliably useful. If the signal is large enough, the level sensor delivers a signal to a pulse-shaping circuit 80 which produces a pulse, preferably of rectangular shape, which is of a fixed amplitude and has a pre-determined time duration.

The processing circuitry for use with the anode wires is similar to that used with the cathode elements. The negative pulse from an anode wire such as the wire 22 passes through a coupling capacitor 53 to an amplifying and protective circuit 58 which is identical to the circuit 58 connected to the cathode elements, except that the amplifier 72 for the anode signals is an inverting amplifier which converts the negative anode signal into a positive pulse at the output of the circuit 58. That output is sent to a circuit 59 which is identical to that used with the cathode elements, except that the pulse-shaping circuitry is slightly different since the time required for the development of the positive and negative pulses on the cathodes and anodes of the matrix is somewhat different, and this difference is compensated for by appropriately different pulse-shaping circuits.

THE ADDRESS ENCODERS

The output signal from the circuit 59 flows to an encoder which includes several diodes 92 and a group 90 of wires which will be termed herein as the "Y address lines." The pattern of connection of the diodes 92 to the Y address lines 90 is binary-coded to uniquely represent and identify a particular one of the cathode elements 24 and 31. Of course, there is a different diode array for each cathode element. Two such arrays are shown in FIG. 1, one array having diodes 93, and the other having diodes 95. For the sake of simplicity, only three such arrays are shown in FIG. 1. It also should be understood that there would be amplifying and pulse-shaping circuits as described above which would be connected between each of the cathode wires and points 97 and 99 in FIG. 1.

The Y address lines 90 are connected to a set of transfer gates 132. Thus, there is delivered to one section of the transfer gates 132 a binary-coded signal identifying the particular cathode element in which an ionizing event has occurred. This is the Y coordinate of the cell address.

The output from the pulse-shaping circuit 59 in the anode signal processing circuitry is conducted through several diodes 117 to selected wires of a group of "X address lines" 116. In a manner the same as for the cathode elements, the particular anode wire which has received a pulse is identified by the pattern of diodes connecting it to the "X address line" 116. Additional sets of diodes 119 and 121 are provided for the other anodes 20 and 21. The parallel binary-coded signal identifying the particular anode wire which has been energized also is delivered to one section of the transfer gates 132. Thus, by means of the above-described encoders, binary coded signals representing the complete address of a cell in which an ionizing event has occurred are delivered to the transfer gates 132.

ANTI-AMBIGUITY CIRCUITRY

In accordance with another aspect of the present invention, circuitry is provided in order to insure that the address of an ionizing incident will be given unambiguously. Accordingly, the cathode pulses all are delivered to a "Y number bus" 86 through a resistor 82 and a diode 84. The signal from the Y number bus 86 flows past a shunt resistor 88, and through an amplifier 94 to a pair of level detectors 96 and 98 of conventional construction. Detector 98 is set so that it will produce an output signal only when the input signal it receives is above a certain minimum value which is below a "base" value which is defined as the value of a signal which would be produced on bus 86 when only one signal from one cathode is generated at a given time. The upper level sensor 96 produces an output signal whenever its input signal is greater than the base value.

Referring now to the lower right-hand portion of FIG. 1, the output signal from the shaping circuit 59 for the anode wires passes through a resistor 118 and a diode 120 to a "X number bus" 122, and thence past a resistor 124 shunting the bus 122 to ground, to an amplifier 126 and a pair of level detectors 128 and 130.

The level detector 130 is set to be a lower level detector; that is, it will produce an output signal only when it receives an input signal which is greater than a certain minimum value which is below the "base" signal which would be produced by one anode wire. The detector 128 serves as an upper level detector and produces an output signal whenever its input signal is greater than the base signal level.

The outputs of the four level detectors 96, 98, 128 and 130 are sent to a four-input AND gate 100 of conventional construction. The AND gate 100 inverts the input signals from the upper level detectors 96 and 128, and does not invert the other two inputs. Therefore, circuit 100 will produce an output signal if and only if both lower level sensors 98 an 130 have fired, and neither upper level sensor 96 or 128 has fired. Thus, circuit 100 will produce an output signal only if only one anode pulse and only one cathode pulse is received at a given time. If more than one anode or cathode pulse is received at a given time, no output signal will be produced by the circuit 100. Thus, if ionizing incidents are detected simultaneously in two or more different cells, ambiguity in locating the incidents is prevented by this means. Because the gas ionization is in the proportional mode, the recovery time is small, and the operation of the electrical system is relatively rapid so that the number of ionizing incidents which are not recorded due to their simultaneous detection by the detector system is relatively small.

OUTPUT DEVICES

The output signal from circuit 100 passes through a pulse shaper 102 which gives it a square wave shape and proper timing for unambiguous sampling of the address and energy information. The output signal then flows to the transfer gates 132 and causes them to transfer the coded address signals to an output register 134. A conventional "flag" register 104 is provided to indicate that a new output is available to subsequent parts of the system, such as the oscilloscope 56, when it has read the information from the output register 134. A reset signal is sent to the register 104 over line 105 by the oscilloscope 56 when it has completed the processing of a particular digital output signal.

In the operation of the system described above, binary-coded information which gives both the X address and the Y address of the cell which has been energized will be delivered to the output register and will be used to control the spot location on the screen of the oscilloscope 56. Alternatively, this information can be delivered from the output register 134 to a computer (not shown) which can use it in its computations regarding the radiation.

SCANNING THE DETECTOR

In accordance with another aspect of the present invention, the image resolution of the detector device 10 can be enhanced by mechanical movement of the detector relative to the radiation source. Referring again to FIG. 1, this movement is accomplished by means of a pair of servo-motors 133 and 138. The "Y" servo-motor 133 drives an advance screw 135 which moves the matrix 10 back and forth in the Y direction, as is shown in FIG. 1. A conventional analog-to-digital shaft-position encoder 137 provides a parallel-form binary output signal which represents the Y coordinate of the detector position. This signal is transmitted over lines 136 to one section of the transfer gates 132. Similarly, movement in the X direction is accomplished by means of a "X" servo-motor 138 driving a lead screw 143. The position of the matrix along the X axis is encoded by means of another shaft-position encoder 141 which delivers a parallel binary signal through leads 139 to one of the transfer gates.

Figure 7:
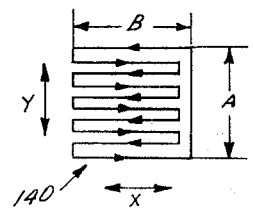
FIGS. 7 and 8 are diagrams explaining certain operational features of the present invention.

Preferably, the mechanical scanning movement through the matrix 10 is relatively small and is restricted so that any given point on the matrix moves only within an area corresponding to the surface area of one matrix cell. For example, the scanning pattern 140 shown in FIG. 7 can be followed. The pattern shown in FIG. 7 is the path followed by a given point in the matrix during the scanning motion. The dimensions A and B are designed to be the same as the dimensions of a particular cell in the matrix.

The matrix position information which is delivered over lines 136 and 139 to the transfer gate is read out of the output register 134 as a part of the digital word which describes the location of the ionizing incidents detected by the detector device. This further information provides additional resolution in the formation of the radiation image because it gives the coordinates of the matrix at the time when recurrent flux from a given point in the radiation source appears in the next cell rather than in the first cell in which it appeared. Thus, the corresponding point in the image can be located far more precisely.

ENERGY LEVEL INDICATION

Information also can be provided concerning the energy of the particle being detected. For this purpose, the signal output from every anode amplifier circuit 58 is conducted through a series resistor 106 to an "energy bus" 107 and past a shunt resistor 108, through to gain control device 110 and an amplifier 112, to a pulse-height analyzer 114. Pulse-height analyzer 114 is a conventional analog-to-digital converter which gives a parallel-form binary-coded output on its output leads 115 which represents the magnitude of the pulse it receives. This information is delivered to the transfer gates and then to the output register 134 and the output device 56.

Figure 8:
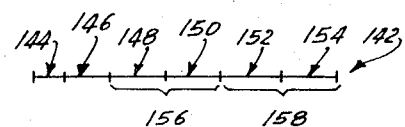

If all of the foregoing information is provided concerning the radiation being detected, the complete digital word which has stored in the output register 134 has the components shown in FIG. 8. The first portion 144 of the digital word 142 is a single-bit "flag" signal produced by the flag circuit 104. The second portion 146 is an energy level signal taken from the pulse-height analyzer 114.

The next segment 148 is the X coordinate information from the X address lines 90. The next segment 150 is the X scan position information from the X scan lines 139. Together, segments 148 and 150 provide the complete X address 156 of the output word 142. The next segment 152 is the Y address information from the Y address lines 116, and the following portion 154 is the Y scan position information from the lines 136. Together, the portions 152 and 154 form the complete Y address 158 of the ionizing event.

The following is a specific example of a detector which has been built and successfully tested. The detector has the structural form substantially as shown in FIGS. 1 and 2. It has seven copper cathode elements approximately one centimeter wide, with walls 23 forming three troughs, each being approximately 1 centimeter deep and 1 centimeter wide. The wires 20, 21 and 22 are made of platinum-iridium and have a diameter of approximately 10 mils or 0.25 millimeter. The housing 32 and cover 38 are made of Mylar, and the inner continuous thin aluminum layer deposited onto the undersurface of the housing 38 had a thickness of about 1 micron. A supply voltage in the vicinity of 1,500 volts was applied to the anode during testing of the detector.

The quantum and geometric efficiency of the detector 10 is quite high, and it is believed to be very much higher than convention X-ray imaging means in common use today. Thus, low-energy X-rays can be detected with high efficiency and high resolution. If low dosages of X-rays are used in medical examinations with this detector instead of high dosages now required, the resulting radiation dosages are believed to be low enough so that the patient and doctor can be subjected to the radiation repeatedly without fear of overdosage.

ALTERNATIVE EMBODIMENTS

The detector construction 10 shown in FIGS. 1 and 2 is best adapted for detecting relatively low-energy radiation. For such purposes, it is desired that the metal at the entry window be relatively thin so as not to unduly impede the radiation from reaching the internal portion of the detector. Since the gas pressure inside the detector need not be high when detecting low-energy radiation, the cover 38 need not be exceedingly strong. However, when high-energy radiation is being detected, it is desirable to have as high an internal gas pressure as possible in order to give the detector a greater ability to stop the particles.

Figure 3:
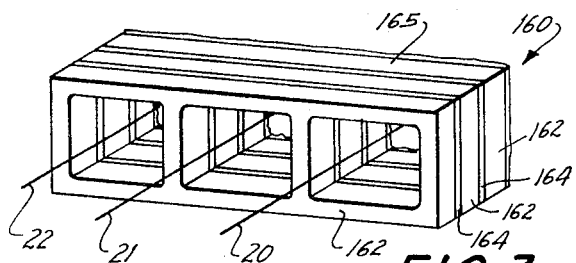
FIG. 3 is a perspective, partially schematic view of another embodiment of the present invention.

FIG. 3 shows a detector which is particularly useful for detecting high-energy radiation. The detector 160 is formed by laminating a series of metal (e.g., beryllium) cathode structures 162 with similarly shaped members 164 made of insulating material. Each of the laminae can be formed by masking and photo-etching techniques, and the laminae can be fastened together by means of epoxy resins or other known adhesives and bonding materials. Of course, the ends of structure are closed to make it gas-tight, supports are provided for the anode wires, and gas entry and exit conduits are provided. This structure is strong and allows the gas pressure in the cells to be made relatively high without rupturing the structure. Since the particles being detected have a relatively high energy, the upper wall 165 of the structure need not be made as thin as in the low-energy detector.

Examples of what is meant by "low-energy" particles are photons with an energy of 800 electron volts. With such low energy photons, the aluminum strips on the cover 38 should be quite thin; e.g., of the order of 0.1 to 0.3 micron in thickness. Coatings of this thickness advantageously are formed by vapor deposition or similar techniques. Relatively high-energy particles, such as photons with an energy of 100,000 electron volts, can tolerate a window thickness of several millimeters.

Figure 4:
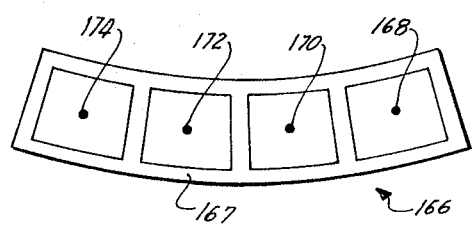
FIGS. 4, 5 and 6 are elevation views of further embodiments of the present invention.

The detector of the present invention can be made to have either a single-curved or a compoundly curved configuration. A single-curved detector 166 is shown schematically in FIG. 4. Detector 166 is substantially the same as that shown in FIG. 3, except that the cathode elements are curved so that radiation from a point source will be directed perpendicularly into all of the cells of the detector. If means is provided for supporting the anode wires 168, 170, 172 and 174 along their lengths, they can be curved, and a compoundly curved matrix structure can be provided.

Figure 5:
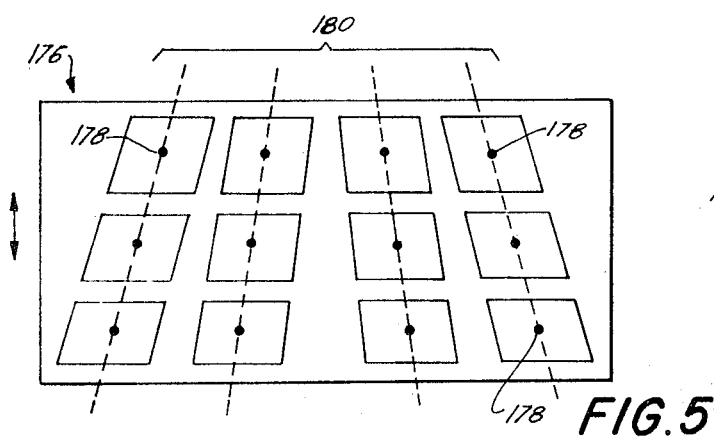

FIG. 5 illustrates another alternative detector structure 176. In this arrangement, the cathode structure is not curved, but the cells are inclined with respect to the vertical axis of the detector so as to facilitate reception of radiation from a point source. Furthermore, the cells are arranged one behind the other along lines 180 which are directed towards a focal point from which the radiation emanates. Such a radial arrangement of cells avoids any ambiguity by making the address assigned to an X-ray ionizing event independent of the depth at which the X-ray was stopped, for a point source of high energy X-rays. Also, such an arrangement provides several different volumes of gas which are positioned in series in the path of a particle so as to be more effective in stopping high-energy particles.

It should be understood that all of the detectors described herein can have as many cells as desired. The image resolution of the device is increased by increasing the number of cells per unit of detector area.

Figure 6:
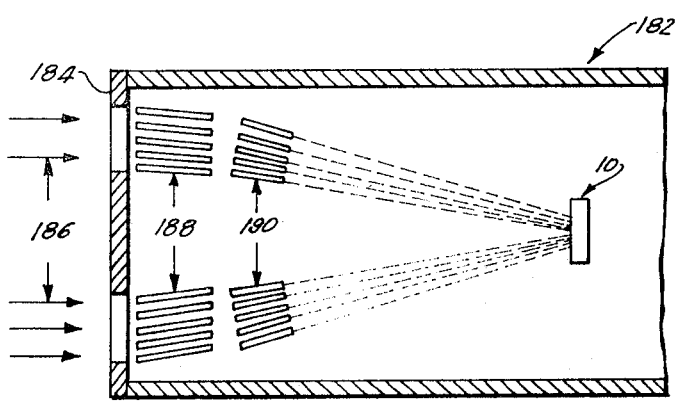

Another embodiment of the invention is shown in FIG. 6. FIG. 6 shows an X-ray focusing device 182 which is used to collect and detect X-radiation from astronomical objects. The tracking device 182 includes a housing 184 with openings through which x-radiation from these objects, traveling in the direction indicated by the arrows 186, enters the housing 184. A plurality of flat, "tension-polished" plates 188 and 190, which preferably are fire-polished glass plates, are provided to give "glancing incidence" reflection of the x-radiation to a focal plane in which the detector 10 is located. The detector 10 advantageously forms an image of the radiation pattern it receives.

Further details of the collector portion of this X-ray astronomical system 182 are given in my co-pending U.S. Pat. application Ser. No. 613,858 filed Feb. 3, 1967, now U.S. Pat. No. 3,543,024, issued Nov. 24, 1970, the disclosure of which hereby is incorporated herein by reference.

The cross-sectional shape of the cells of the matrix of the present invention preferably is square, as shown in FIG. 2, because cells of this shape are easy to construct. However, the cells can be of circular cross-section, or can have other shapes. It is desired, however, in any particular shape selected, to maintain a substantially uniform electric field around the anode wire 20. If such a uniform field is maintained, the device will have good energy resolution; that is, the device can be used to differentiate between different particles having different energies. The efficiency and image resolution of the device also is high. Thus, background noise, cosmic rays, and other undesired ionizing incidents can be discriminated against by the detector, or, if desired, the energy-level detecting system of the present invention can be used to identify the type of particle being detected.

I claim:

1. A proportional radiation detector comprising, in combination, a matrix of detector cells, said matrix comprising two groups of conductors, the conductors of one group being transverse to and spaced from the conductors of the other group, the conductors within each such group being electrically isolated from adjacent conductors in the same group, each of the conductors of one of said groups comprising a plurality of interconnected conductive members each of which substantially encircles one of the conductors of the other of said groups, and thus forms one of said cells and means for separately detecting an electrical signal from each of said conductors and for indicating the cell address of a gas-ionizing incident in said detector.

2. Apparatus as in claim 1 including means for disabling said address-indicating means in response to the receipt of signals from two of said cells substantially simultaneously.

3. Apparatus as in claim 1 in which said detector matrix is curvilinear, with the cells thereof oriented along radii from a point located outside of and away from said matrix.

4. Apparatus as in claim 1 including a plurality of means, each for producing an encoded signal from a separate one of said conductors, register means, and means responsive to the receipt of only one signal from the conductors of each of said groups for transferring said signals to said register means.

5. Apparatus as in claim 4 including visual display means for receiving said signals from said register means and displaying an image of said radiation.

6. A proportional radiation detector comprising a plurality of elongated anode elements, a plurality of cathode elements, said cathode elements being spaced from said anode elements, said cathode elements being formed into rows, each cathode element in a given row extending around a pre-determined one of said anode elements, said cathode elements being arranged in columns extending in a direction transverse to the direction in which said anodes extend, with the cathode elements in each column being electrically connected to one another, and a plurality of electrical signal detecting means, one connected to each anode and one connected to each column of cathodes to indicate the co-ordinates of each ionizing event taking place in said radiation detector.

7. Apparatus as in claim 6 in which each of said columns of cathode elements comprises an integral conductive member with a plurality of spaced walls.

8. Apparatus as in claim 7 in which said walls form troughs, and including other members effectively closing the gaps across said troughs to form each trough into a closed loop around an anode element.

9. Apparatus as in claim 7 in which each of said cathode elements has integral means forming a conductive loop about one of said anode elements.

10. Apparatus as in claim 7 including laminae of insulating material bonded between adjacent cathode elements.

11. Apparatus as in claim 6 in which the array of cathode elements in each row has prismatic symmetry.

12. A radiation collection and imaging device comprising a plurality of glancing-incidence, tension-polished reflection plates positioned to reflect X-ray radiation to a focal plane, a proportional radiation detector positioned in said focal plane, said detector comprising a matrix of detector cells, said matrix comprising two groups of conductors, the conductors of one group being transverse to and spaced from the conductors of the other group, the conductors within each such group being electrically isolated from adjacent conductors in the same group, each of the conductors of one of said groups comprising a plurality of interconnected conductive members each of which substantially encircles one of the conductors of the other of said groups, and thus forms one of said cells.

13. A proportional radiation detector comprising, in combination, a matrix of detector cells, said matrix comprising two groups of conductors, the conductors of one group being transverse to and spaced from the conductors of the other group, the conductors within each such group being electrically isolated from adjacent conductors in the same group, a cell being formed at each location in said matrix at which a conductor of one group crosses a conductor of another group, means for separately detecting an electrical signal from each of said conductors and for indicating the cell address of a gas-ionizing incident in said detector, and means for disabling said address-indicating means in response to the receipt of signals from two of said cells substantially simultaneously.

14. A proportional radiation detector comprising, in combination, a matrix of detector cells, said matrix comprising two groups of conductors, the conductors of one group being transverse to and spaced from the conductors of the other group, the conductors within each such group being electrically isolated from adjacent conductors in the same group, each of the conductors of one of said groups comprising a plurality of interconnected conductive members each of which substantially encircles one of the conductors of the other of said groups, and thus forms one of said cells, another matrix like said first-named matrix, with the cells of said other matrix aligned behind the corresponding cells of said first-named matrix.

15. A proportional radiation detector comprising, in combination, a matrix of detector cells, said matrix comprising two groups of conductors, the conductors of one group being transverse to and spaced from the conductors of the other group, the conductors within each such group being electrically isolated from adjacent conductors in the same group, each of the conductors of one of said groups comprising a plurality of interconnected conductive members each of which substantially encircles one of the conductors of the other of said groups, and thus forms one of said cells, means for separately detecting an electrical signal from each of said conductors and for indicating the cell address of a gas-ionizing incident in said detector, and means for moving said detector relative to said source, and for indicating the relative positions of said source and said detector.

16. Apparatus as in claim 15 in which any point on said detector is moved over an area no greater than the area of one of said cells.

17. A proportional radiation detector comprising, in combination, a matrix of detector cells, said matrix comprising two groups of conductors, the conductors of one group being transverse to and spaced from the conductors of the other group, the conductors within each such group being electrically isolated from adjacent conductors in the same group, a cell being formed at each location in said matrix at which a conductor of one group crosses a conductor of another group, means for separately detecting an electrical signal from each of said conductors and for indicating the cell address of a gas-ionizing incident in said detector, and means for disabling said address-indicating means in response to the receipt of signals from two of said cells substantially simultaneously, said disabling means including electrical signal level sensing means connected to one group of conductors for producing an output signal only when its input signal has a magnitude which is no greater than a base value which is approximately equal to the magnitude of the signal of one of said conductors.

18. Apparatus as in claim 17 including a second one of said level sensing means, all of the conductors in the other group being connected to said second level sensing means, AND circuit means, and means for connecting the outputs of said level sensing means to the input terminals of said AND circuit means.

19. Apparatus as in claim 18 including gate means, address encoding means connected as an input to said gate means, register means, the output of said AND circuit means being connected to said gate means to read encoded address information into said register means.

20. A proportional radiation detector comprising, in combination, a matrix of detector cells, said matrix comprising two groups of conductors, the conductors of one group being transverse to and spaced from the conductors of the other group, the conductors within each such group being electrically isolated from adjacent conductors in the same group, a cell being formed at each location in said matrix at which a conductor of one group crosses a conductor of another group, means for separately detecting an electrical signal from each of said conductors and for indicating the cell address of a gas-ionizing incident in said detector, and means for creating in each of said cells a substantially uniform electrical field between the crossing conductors of said groups.

21. Apparatus as in claim 20 in which the conductors of one of said groups comprise wires each of which crosses over a plurality of the conductors in the other of said groups.

22. Apparatus as in claim 21 in which each of the conductors in other of said groups includes conductive walls substantially surrounding and symmetrically spaced from one of said wires at each crossing of one of said wires over one of said other conductors.

* * * * *